Nov. 28, 1944.   H. G. BUSIGNIES   2,363,941
ANGLE INDICATING APPARATUS
Filed March 5, 1941   3 Sheets-Sheet 2
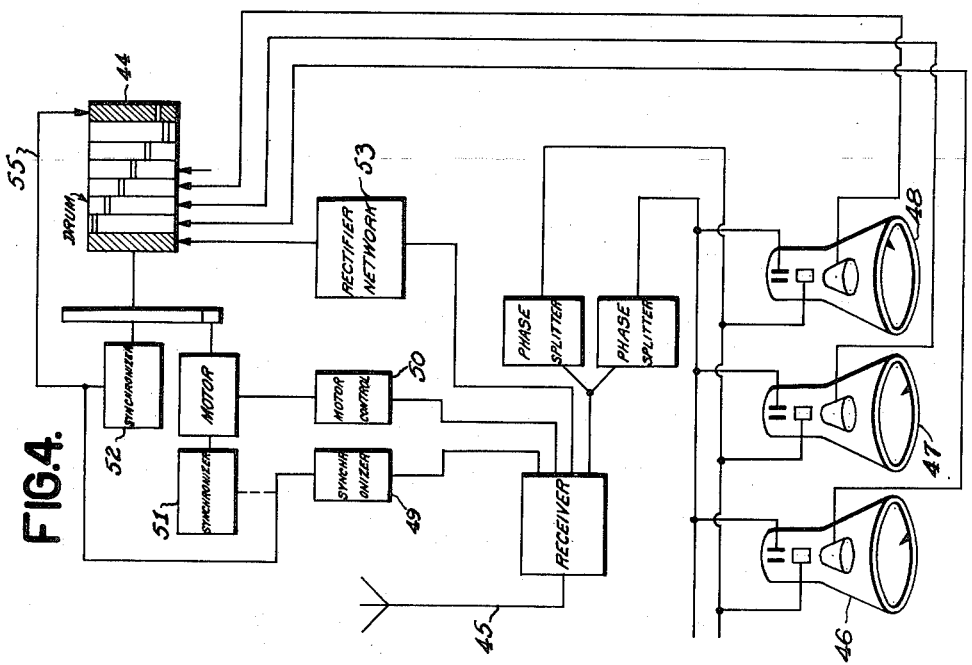
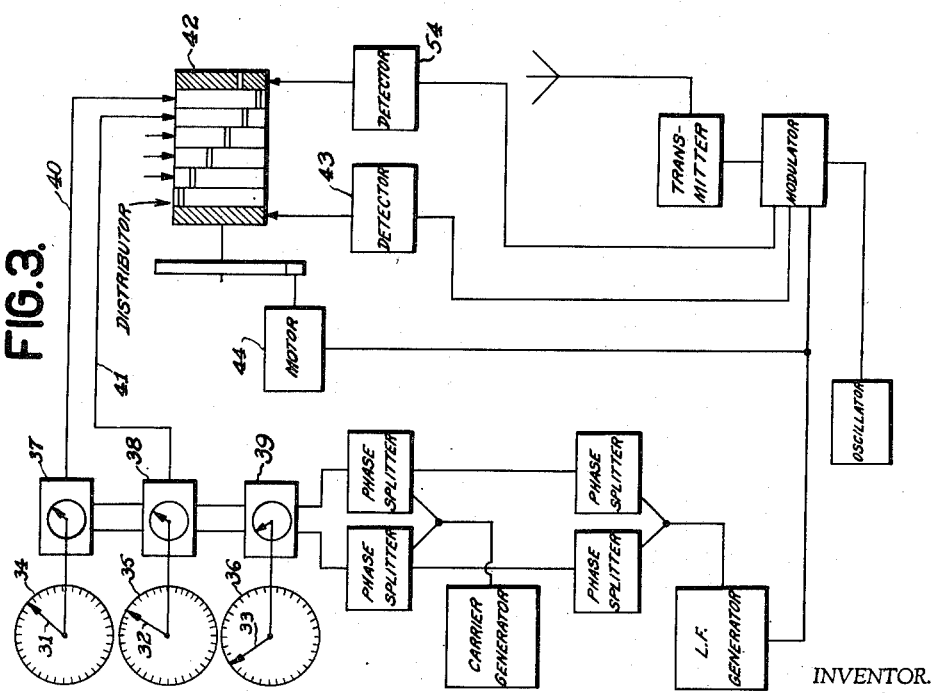
INVENTOR.
HENRI G. BUSIGNIES
BY
ATTORNEY Patented Nov. 28, 1944

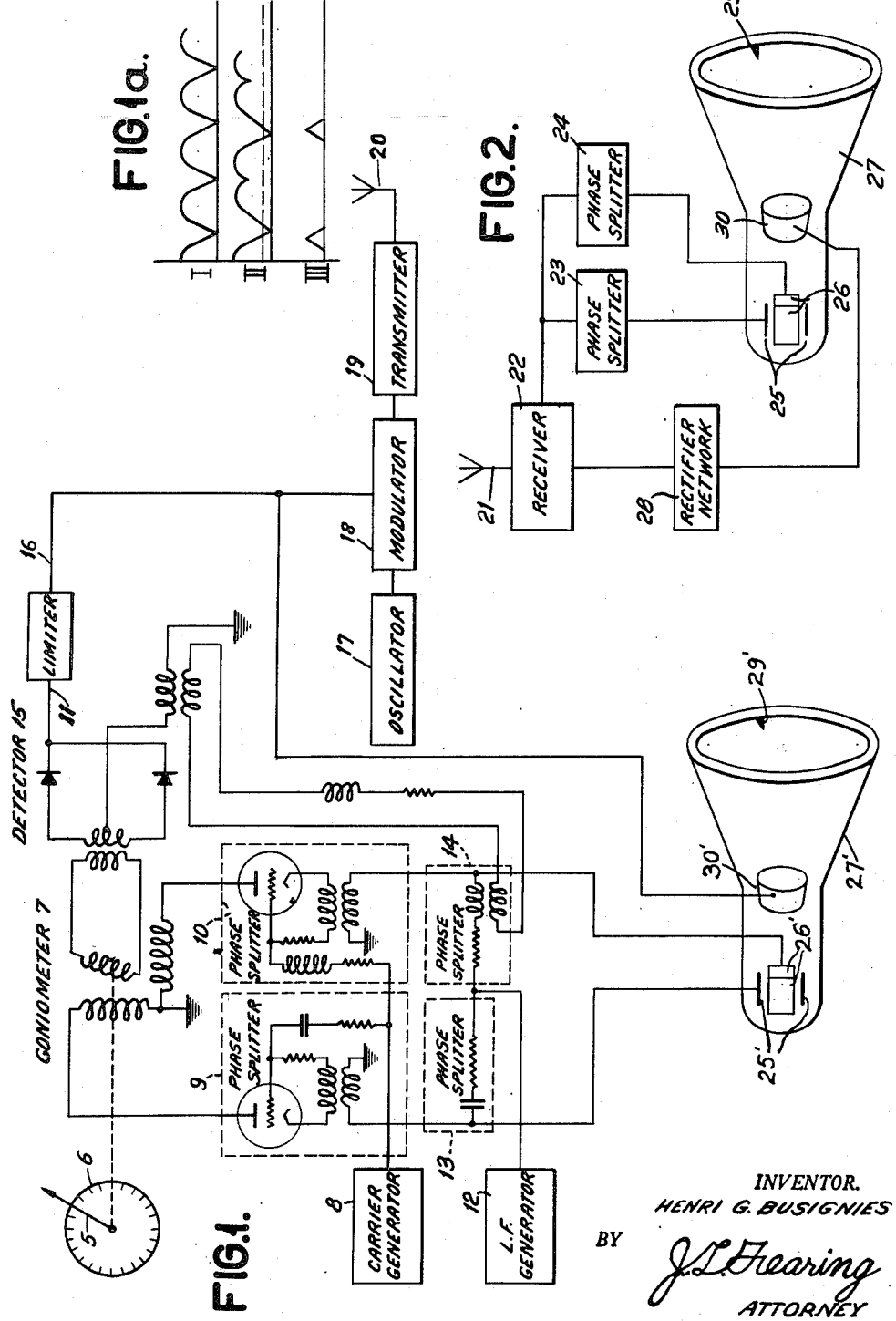

2,363,941

UNITED STATES PATENT OFFICE 2,363,941

ANGLE INDICATING APPARATUS

Henri G. Busignies, Forest Hills, N. Y., assignor to International Standard Electric Corporation, New York, N. Y., a corporation of Delaware Application March 5, 1941, Serial No. 381,838

7 Claims. (Cl. 177—337)

This invention relates to improvements in radio signaling devices and in particular to apparatus for giving distant indication of a desired angular relationship.

It is an object of the invention to provide improved means for giving a distant indication of a desired angular relationship.

Another object is to provide a radio system for indicating at a remote location a particular angular, linear or other displacement.

Another object of the invention is to provide improved means for displacing the phase of a wave modulating a carrier.

A more specific object is to provide a radio system for closely following and indicating angular movement, that is, a radio system analogous to the familiar selsyn arrangement.

Still another object is to provide improved means for indicating a plurality of remote simultaneous angular or other displacements, the indications being simultaneous on a plurality of indicators, on a single indicator, or a compilation of the various displacements in a single indication.

Another object is to provide improved motion indicating apparatus automatically compensating for the action of an independently varying motion.

A further and more specific object resides in the provision of an improved form of ship's telegraph, whereby no conductive wires are necessary between the control instrument on the bridge and the indicating instrument in the engine room.

A further specific object is to provide improved fire-control means for ships and other moving vessels.

Other objects and various further features of novelty and invention will hereinafter be pointed out or will occur to those skilled in the art from a reading of the following specification in conjunction with the drawings included herewith. In said drawings, which are merely illustrative of preferred embodiments of the invention Fig. 1 is a schematic block diagram of angle-displacement transmitting apparatus incorporating features of the invention;

Fig. 1a is a graphical showing of wave shapes obtained in the apparatus of Fig. 1;

Fig. 2 is a schematic block diagram of apparatus adapted to receive and indicate angular displacement signals transmitted by the apparatus of Fig. 1;

Figs. 3 and 4 are schematic block diagrams of transmitting and receiving equipment incorporating further features of the invention.

Figure 5:
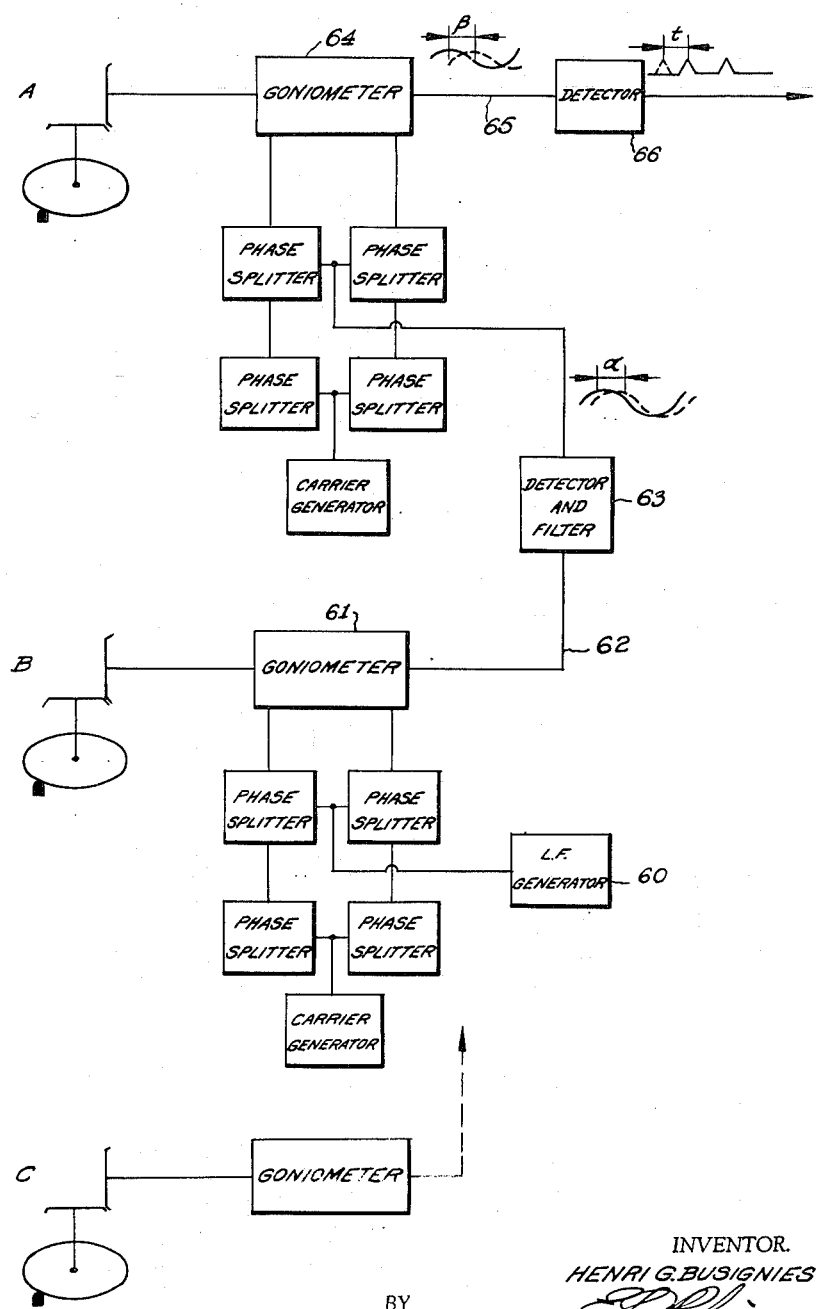
Fig. 5 is a schematic block diagram of transmitting equipment arranged to get a summation or differential effect of two or more independently varying angles.

The invention will now be described with reference to a possible practical application of apparatus incorporating features thereof, namely, an improved form of ship's telegraph. It will be understood throughout, of course, that the invention may readily be adapted to other uses without departing from its scope.

At the present time, generally, apparatus for giving distant indications of angular relationships involve either an electrical or mechanical connection between the transmitting and receiving apparatus. It is readily conceivable, then, that in the case of such apparatus on board ship in time of war, the system is particularly vulnerable or susceptible of breakdown in that it extends over a substantial portion of the ship. Accordingly, certain features of the present invention are concerned with provision of a ship's telegraph system having no control wires or other means between transmitter and receiver. It will be appreciated, furthermore, that in apparatus designed for the heavy use contemplated in the present case, extremely reliable and sturdy equipment must be provided.

A preferred form of apparatus proposed in accordance with the above-referred-to features of the invention includes a transmitter operative at such a high frequency that advantageous use may be made of the dielectric properties of antennas. Such a transmitter may, as will later be clear, be employed to handle a plurality of angular or other displacement indications; for example, it may readily be conceived that a dozen indications may be transmitted on the same carrier without entailing any particular complications. The receiving equipment may comprise usual classic radio circuits and may include as many indicators, preferably cathode ray tubes, as there are angle indications to be read. In the case under consideration, it is deemed preferable to provide, for purposes of simplicity and easier calibration to a single scale, a separate indicating tube for each reading to be taken; but, of course, it is to be understood that a smaller number of indicator tubes may be employed, each tube giving several readings.

Preferably, the reading or indication on each tube is a radially extending line corresponding to a meter needle, thus giving a familiar angular indication. Methods for producing this type of reading are well known and have for some time been proposed.

A preferred form of general circuit for the transmission of a single angular displacement indication is shown in Fig. 1. The angle to be indicated remotely is shown schematically as a crank 5 traversing a scale 6. It will be appreciated that such motion may correspond to manual operation of the above mentioned ship's telegraph, to gun range finder manual settings and adjustments, or other familiar motions, manual or otherwise controlled.

In the form shown the shaft of the crank 5 is fixed thereto and may be coupled to the rotor or search coil of a goniometric device 7. The two stator coils of the goniometer are disposed mutually perpendicular and supplied with high carrier frequency energy from an appropriate generator 8. A rotating field of carrier frequency energy may be set up by the stator coils by the insertion of appropriate phase splitting networks 9, 10 in the lines feeding the respective stator coils, whereby the currents in the respective coils are of equal magnitude and in quadrature phase relation to one another, as will be clear.

From a consideration of the circuit thus far described it will be appreciated that the high frequency energy output from the search coil of the goniometer on line 11 has a definite phase relation depending upon its angular displacement with respect to the stator coils. Moreover, since the search coil has been stated as fixedly related to the crank 5, the phase displacement in line 11 is definitely related to displacement of crank 5. It will be further appreciated that the search coil output represents merely a change in phase and that the amplitude of this output current will always be substantially the same.

In the preferred form shown I modulate the above mentioned carrier frequency with a low frequency in such a way that the low frequency output from the goniometer search coil is displaced in phase an amount proportional to rotation of the crank 5. To this end a low-frequency generator 12 is applied to appropriate phase-splitting networks 13 and 14 in order to obtain two low-frequency currents in phase quadrature and of equal magnitude. Each of these quadrature currents is then fed to one of the phase-splitting networks 9, 10 where it may modulate the carrier frequency. It will be appreciated that the output from the search coil will be in the form of an envelope varying from peak to peak every 360° of the low-frequency cycle. Peak phase displacement may thus represent 360° of rotation of the search coil, that is, there will be a distinct, characteristic phase displacement of the low-frequency output in line 11 for any angular position of the search coil within a 360° or full rotational range.

In order to obtain a definite indication of the modulated peaks in line 11, I may detect the signal, then rectify the low-frequency signal to get full-wave rectification (I, see sketch Fig. 1a), suppress every odd peak from such rectification (II, Fig. 1a), and by amplitude limiting means obtain an output of a short impulse for every 360° of the low frequency (III, Fig. 1a). The means for accomplishing this treatment of the signal in line 11 is shown as a block 15 and forms the subject of my application, entitled "Radio compass," Ser. No. 381,837, filed on even date herewith, now Patent No. 2,320,908, June 1, 1943.

It is this cyclically recurring impulse that I propose to transmit as an indication of the angular disposition of crank 5. For this purpose I employ conventional transmitting apparatus and preferably in the following manner: Carrier frequency, generated by an oscillator 17 or possibly by the source 8, may be fed to a modulator circuit 18 which is modulated by phase-displaced impulse as detected at 15 and so transmitted by appropriate transmitter and antenna means 19 and 20, respectively. For synchronization purposes at the receiver I deem it preferable also to modulate the carrier frequency generated by oscillator 17 with low frequency oscillations supplied from the source 12. It will be understood, then, that the finally transmitted wave incorporates a steady reference signal (supplied by generator 12) and an indication (the impulse from detector 15) related thereto in such a way as to represent displacement of crank 5 from a reference origin.

Fig. 2 represents possible receiving equipment for detecting and visually indicating the above-mentioned angular displacement. The signal received by an antenna 21 may be fed to a receiver network 22. The receiver 22 preferably includes means for detecting the reference low-frequency envelope, which was originally furnished by the generator 12, and supplying this reference frequency energy to appropriate phase-splitting networks 23, 24. By adjustment of the networks 23, 24 their respective output currents may be equal in magnitude and in phase quadrature, thus suitable for application to the deflection plates 25, 26 of a cathode ray tube 27 to obtain a uniform sweep of the cathode beam.

The receiving equipment may further include an appropriate rectifier network 28 for detecting and amplifying the phase-displaced impulse that was originally supplied by the network 15. By applying this impulse to an appropriate electrode 30 in the tube 27 and by known methods, it will be appreciated that a radial deflection 29 of the beam will appear at a certain angular position on the screen of tube 27 with respect to a reference position, and that this angular position may represent the angular position of crank 5.

As a means of checking as to the proper functioning of the transmitting apparatus of Fig. 1, I propose provision of an additional cathode ray tube 27', similar to the receiving indicator tube 27. An appropriate angular indication 29' may be obtained on the screen of tube 27 by energizing the deflection plates 25' and 26' from the low-frequency phase-splitting networks 13, 14 and applying impulse energy from detector 15 to additional electrode 30', similar to electrode 30 of tube 27.

It is to be understood that the above description in connection with features of the invention shown in Figs. 1, 1a, and 2 represent a general and simplified arrangement for the indication of the angular variation of only one member. It is, of course, possible to employ substantially the same apparatus for the simultaneous transmission of a plurality of different angular or other displacements. Figs. 3 and 4 show a possible solution of such a problem, Fig. 3 representing the transmitting apparatus and Fig. 4 the receiving apparatus.

In Fig. 3 a number of the elements above discussed in connection with the simplified case will be recognized. In the form shown a plurality of cranks 31, 32, 33 are rotatable with respect to scales 34, 35, 36 and the respective relative angular displacements are to be indicated separately or in combination at a remote location. As in the case of the crank 5 in Fig. 1 cranks 31, 32, 33 may all be coupled to search coils of appropriate goniometric devices 37, 38, 39. As will be recalled from the above-discussed simplified case the stator coils of the goniometers 37, 38, 39 may be supplied with a carrier frequency modulated by a low frequency, the supply current for the respective coils of each goniometer being in phase quadrature, as will be clear. As the cranks 31, 32, etc. are respectively rotated it will be clear that phase displacement of the low-frequency envelope in output lines 40, 41, etc. will be strictly indicative of the independent angular displacements of cranks 31, 32, etc. I propose to transmit a plurality of such displaced signals simultaneously, or rather in exceedingly rapid succession, by means of a distributor 42, or other appropriate keying means. The keyed output from distributor 42 represents a successive scanning of the plurality of phase displacements and common detection means, similar to 15 in Fig. 1, may be employed to produce a corresponding plurality of successive displaced impulses, as will be readily understood.

Subsequent treatment of the impulses so obtained may be the same as indicated in Fig. 1. Here again, by additionally modulating the transmission carrier with the low frequency, a common reference may be obtained for all the impulses. Furthermore, synchronizing operation of the motor 44 (driving the distributor 42) with the low-frequency oscillations, a definite reference is established by which appropriate synchronizing means in the receiver may always keep a corresponding distributor in the receiver in synchronism with distributor 42.

The receiver circuit of Fig. 4 is essentially the same as that of Fig. 2 with the exception that appropriate keying means 44 is employed in synchronism with distributor 42 for separating the received impulses into appropriate indicating channels. Energy received by the receiving antenna 45 incorporates a reference low frequency and superimposed short impulses. From the former of these received signals an appropriate circuit in the receiver derives sweep circuit reference frequency energy for cathode ray indicating tubes 46, 47, 48, as in the case of the circuits of Fig. 2. This same reference frequency may also be employed by means of appropriate motor speed and synchronizing control circuits 49, 50, 51, 52 to drive the drum or keying means 44 exactly in step with distributor 42 in the transmitting apparatus.

As in the simplified case of Fig. 2 an appropriate rectifier and amplifier network 53 detects and amplifies the impulse signals and applies them to distributor 44 for distribution to appropriate auxiliary electrode control circuits for cathode ray indicating tubes 46, 47, 48, etc.

If desired additional synchronization assurance may be obtained by providing an additional key on distributor 42 to operate, say, once per revolution of the distributor 42. The keyed impulse obtained therefrom by appropriate pick-up means may be detected, and suitably shaped by a network 54 (in Fig. 3) for additionally modulating the transmitted signal. An appropriate detection network in the receiver (Fig. 4) may supply this synchronization impulse in a line 55 brushing a corresponding key in drum 44; and by well-known motor-control means additional stability may thus be obtained, as will be clear.

In accordance with still further features of my invention I may employ my angle indicating apparatus to get a summation or differential effect of two or more independently varying angles. A possible embodiment of such apparatus is shown schematically in Fig. 5, in which the elements of Fig. 1 will again be recognized.

In the form shown in Fig. 5 a low-frequency generator 60 supplies energy for modulating carrier current in phase quadrature, and such quadrature currents are applied to the mutually perpendicular coils of a goniometer device 61. The search coil of goniometer 61 is coupled to displaceable device B; and upon displacement of the latter, a corresponding proportional phase displacement of the modulated envelope is obtained in the search coil output circuit 62. By appropriate detection and filtering in a network 63 a wave may be obtained from network 63, said wave having the same shape, and even amplitude, as that supplied by generator 60, but this wave will be phase displaced by an angle $\alpha$ corresponding to movement of the control member B.

The wave obtained from network 63 may next be employed to modulate the quadrature currents obtained from another carrier frequency generator to supply the mutually perpendicular coils of another goniometer device 64. Although a separate carrier frequency generator is shown for each goniometer circuit, it is clear that one such generator will suffice to supply both goniometers. Goniometer 64 may likewise include a search coil coupled to a controlled displacement member A. It will be clear, then, that the phase displacement in the output circuit 65 of goniometer 64 represents a combination or joint effect of the independent displacements of members A and B from a given origin. Appropriate detection in a network 66, similar to that employed in the above-discussed circuits may be used to obtain short signal impulses, displaced in phase an angle $\beta$ from the reference origin. As in the other described cases these impulses may be transmitted for appropriate indication of the angle $\beta$ at a remote location.

It will be at once apparent that apparatus incorporating features of the arrangement of Fig. 5 will be adaptable to obtain the differential or summation effect of two independently varying relationships. A possible adaptation of such apparatus and one that suggests itself immediately is in the fire-control of guns on a ship or other moving vessel. Accurate aim at an objective in spite of the undulatory motion of the firing ship may be assured by, for instance, arranging the control B (Fig. 5) to operate in accordance with the pitch or roll of the ship away from the vertical. At the same time an observer, say in the fire control tower, could in operating his sighting instruments simultaneously control the member A, the latter two being directly connected or related to each other. It will be appreciated, then, that, no matter what the inclination of the firing ship, the sight reading obtained by the observer and transmitted to the firing positions may always be fully compensated and correct.

The above-described differential effect will be appreciated as not being limited to obtain the resultant of merely two independent variables. A third goniometer search coil control C may similarly be provided to furnish a phase-displaced signal to modulate the carrier for goniometer 61, and likewise for as many independent variables as desired.

It will be seen that the apparatus of Fig. 5 represents a vast improvement over mechanical or inductive-electrical differential systems heretofore known. Not only may the apparatus be relatively simple to construct and easily adapted to take account of the effect of additional variables, but the inertia effect and inability to respond to very small changes is not present in my differential system.

With reference to installations of apparatus incorporating features of my invention on ships and other vessels, it is to be understood that the invention is not limited to employing antennas for transmission and reception. To illustrate, commonly used conductor means may be employed such as a coaxial cable. Should operation be interrupted by breakage of the coaxial line, either a spare could readily be installed or a plurality of such lines could be provided in different paths throughout the ship, so that interruption of one would not involve breakdown of the system. On the other hand, the principle of the earth transmission line could be employed so that signals applied at the transmitter between spaced ground points could be picked up at another point on the ship similarly between spaced ground points. In the latter form it will be clear that destruction of the transmitter or of the receiver is necessary before operation will be interrupted.

Another obvious broader application also suggests itself, namely, linear instead of angular displacement, or the combined effects of independently varying linear and angular displacements may be indicated in accordance with my invention. Linear displacement may be employed to rotate the search coil of one of my goniometers by known linkage systems, such as the rack and pinion. By appropriately calibrating the receiver indicating tube scale, such displacement could be read in proper units. For instance, the search coil of a goniometer when properly connected to an optical range finder instrument could be made to give a direct reading of the range of an objective at some remote location, e. g. the firing station, on a ship.

While the invention has been described in particular detail and preferred forms illustrated, it is to be understood that it is not merely limited thereto. It is further to be understood that many other modifications, adaptations, omissions, and additions may be made without departing from the scope of the invention as defined in the appended claims.

What I claim is:

1. A phase-displacement device including a goniometer device having two mutually perpendicular coils and one search coil, said two coils being relatively rotatable with respect to said search coil, a source of high frequency energy, phase-splitting means connected between said source and said two coils of said goniometric device for applying currents in phase quadrature to said two coils respectively, a source of low frequency energy, phase-splitting means connected between said second-mentioned source and said first-mentioned phase-splitting means for applying low-frequency currents in phase quadrature to modulate the high-frequency energy applied to said two coils.

2. Displacement signaling apparatus according to claim 1, further including phase-displacement indicating means responsive to output energy from said search coil.

3. In a displacement-indicating apparatus, a goniometric device including rotor coil means and stator coil means, one of said coil means including a pair of mutually perpendicular coils, means for supplying alternating currents to each of said pair of coils, one of said currents being in phase quadrature with the other of said currents, and phase displacement indicating means responsive to the output of the other of said coil means said indicating means including rectifier means to detect a series of cusp-shaped wave forms and means for effectively suppressing alternate cusps of said wave forms.

4. In a displacement-indicating apparatus, a goniometric device including rotor coil means and stator coil means, one of said coil means including a pair of mutually perpendicular coils, means for supplying alternating currents to each of said pair of coils, one of said currents being in phase quadrature with the other of said currents, means for limiting the voltage and detecting the output of the other of said coil means, high frequency transmission means including a modulator, means for causing said voltage limited output to actuate said modulator, and receiving means responsive to signals so transmitted by said transmission means, said receiving means including phase-displacement indicating means responsive to phase displacement signals detected by said receiving means.

5. In a displacement indicating apparatus, a plurality of goniometric devices each including rotor coil means and stator coil means, one of each of said coil means for each of said goniometric devices including a pair of mutually perpendicular coils, means for supplying alternating currents to each of the coils of said pairs of coils, one of said currents for one of each of said pairs of coils being in phase quadrature with the other of said currents for the other of each of said pairs of coils, a modulating frequency source, means for modulating the alternating currents for one of said goniometric devices with energy from said source, and means modulating the alternating currents for another of said goniometric devices with a current proportional to the output from said one of said goniometric devices.

6. Displacement-indicating apparatus according to claim 4, wherein said alternating current for each coil of said pair comprises a high-frequency current modulated by a low-frequency current.

7. A phase-displacement device including a goniometer device having two mutually perpendicular coils and one search coil, said two coils being relatively rotatable with respect to said search coil, a source of high-frequency energy, phase-splitting means connected between said source and said two coils of said goniometric device for applying currents in phase quadrature to said two coils respectively, a source of low-frequency energy, phase-splitting means connected between said second-mentioned source and said first-mentioned phase-splitting means for applying low-frequency currents in phase quadrature to modulate the high-frequency energy applied to said two coils, means for detecting energy from said search coil, transmitting means including means for modulating carrier energy with output energy from said detecting means and with said low-frequency energy, receiver means responsive to said carrier and including phase-splitting means tuned to said low-frequency energy for generating two low-frequency currents in phase quadrature, a cathode ray device including two substantially perpendicular deflection systems and another deflection system, means connecting said two low-frequency currents to said two deflection systems, and means at said receiver for detecting energy from said first-mentioned detecting means and for applying the same to said other deflection system.

HENRI G. BUSIGNIES.